United States Patent
Simpson

(10) Patent No.: US 11,307,144 B1
(45) Date of Patent: Apr. 19, 2022

(54) EVANESCENT WAVE BASED OPTICAL PROFILER ARRAY

(71) Applicant: Waymo LLC, Mountain View, CA (US)

(72) Inventor: John Simpson, Sahuarita, AZ (US)

(73) Assignee: Waymo LLC, Mountain View, CA (US)

( * ) Notice: Subject to any disclaimer, the term of this patent is extended or adjusted under 35 U.S.C. 154(b) by 35 days.

(21) Appl. No.: 17/023,674

(22) Filed: Sep. 17, 2020

(51) Int. Cl.
| | |
|---|---|
| *G01N 21/64* | (2006.01) |
| *G01S 7/481* | (2006.01) |
| *G01Q 60/22* | (2010.01) |

(52) U.S. Cl.
CPC .......... *G01N 21/648* (2013.01); *G01Q 60/22* (2013.01); *G01S 7/4812* (2013.01); *G01S 7/4818* (2013.01); *Y10S 977/878* (2013.01)

(58) Field of Classification Search
CPC ... G01N 21/648; G01S 7/4812; G01S 7/4818; G02B 6/241; G02B 6/4203; Y10S 977/878; Y10S 977/862; G01Q 60/22
See application file for complete search history.

(56) References Cited

U.S. PATENT DOCUMENTS

| | | | |
|---|---|---|---|
| 5,294,790 A * | 3/1994 | Ohta | G01B 9/04 250/216 |
| 5,812,724 A | 9/1998 | Ohtsu et al. | |
| 5,928,525 A | 7/1999 | Ohtsu et al. | |
| 6,236,783 B1 | 5/2001 | Mononobe et al. | |
| 6,393,185 B1 | 5/2002 | Deacon | |
| 6,813,402 B2 * | 11/2004 | Narita | G02B 6/241 385/12 |
| 7,150,904 B2 | 12/2006 | D'Urso et al. | |
| 7,586,085 B2 * | 9/2009 | Ohtsu | G02B 21/002 250/227.3 |

(Continued)

FOREIGN PATENT DOCUMENTS

DE      4106548 C2      5/1994

OTHER PUBLICATIONS

Flores et al., "Design and analysis of fiber optical distance sensor," Proceedings of SPIE—The International Society for Optical Engineering, Aug. 2005, pp. 58750P-1-58750P-8.

*Primary Examiner* — Michael P LaPage
(74) *Attorney, Agent, or Firm* — McDonnell Boehnen Hulbert & Berghoff LLP

(57) ABSTRACT

An apparatus includes a support structure defining therein substantially parallel cavities extending from a first side of the support structure to a second side of the support structure. The apparatus also includes optical fiber cores each extending from the second side through a corresponding cavity and protruding axially at the first side. The axial protrusion tapers from a first diameter down to a second diameter. The apparatus additionally includes a light emitter optically connected to the optical fiber cores and configured to emit light thereinto. A cut-off size associated with the light is greater than or equal to the second diameter such that an evanescent electromagnetic wave is generated at the cut-off portion. The apparatus further includes light detectors each being optically connected at the second side to a corresponding optical fiber core and configured to measure an intensity of the light reflected from the cut-off portion.

20 Claims, 7 Drawing Sheets

(56) References Cited

U.S. PATENT DOCUMENTS

| | | | |
|---|---|---|---|
| 2008/0080816 A1* | 4/2008 | D'Urso | G02B 6/262 385/77 |
| 2011/0235658 A1 | 9/2011 | Pocholle et al. | |
| 2012/0227263 A1 | 9/2012 | Leclair et al. | |
| 2015/0168702 A1* | 6/2015 | Harris | G01Q 60/18 850/30 |
| 2018/0238806 A1* | 8/2018 | Zhang | G01J 3/4412 |
| 2021/0263070 A1* | 8/2021 | Janunts | G01Q 70/06 |

* cited by examiner

600 — PROVIDING (I) A SUPPORT STRUCTURE COMPRISING AN OPTICAL FIBER CLADDING AND DEFINING THEREIN A PLURALITY OF SUBSTANTIALLY PARALLEL CAVITIES EXTENDING FROM A FIRST SIDE OF THE SUPPORT STRUCTURE TO A SECOND SIDE OF THE SUPPORT STRUCTURE AND (II) A PLURALITY OF OPTICAL FIBER CORES, WHEREIN EACH RESPECTIVE OPTICAL FIBER CORE OF THE PLURALITY OF OPTICAL FIBER CORES EXTENDS FROM THE SECOND SIDE OF THE SUPPORT STRUCTURE THROUGH A CORRESPONDING CAVITY OF THE PLURALITY OF SUBSTANTIALLY PARALLEL CAVITIES AND INCLUDES AN AXIAL PROTRUSION THAT PROTRUDES AXIALLY FROM THE OPTICAL FIBER CLADDING AT THE FIRST SIDE OF THE SUPPORT STRUCTURE, WHEREIN THE AXIAL PROTRUSION OF EACH RESPECTIVE OPTICAL FIBER CORE TAPERS FROM A FIRST DIAMETER AT THE FIRST SIDE OF THE SUPPORT STRUCTURE DOWN TO A SECOND DIAMETER AT AN END OF THE AXIAL PROTRUSION

602 — EMITTING LIGHT INTO THE PLURALITY OF OPTICAL FIBER CORES BY A LIGHT EMITTER OPTICALLY CONNECTED TO THE PLURALITY OF OPTICAL FIBER CORES AT THE SECOND SIDE OF THE SUPPORT STRUCTURE, WHEREIN A CUT-OFF SIZE ASSOCIATED WITH THE LIGHT IS GREATER THAN OR EQUAL TO THE SECOND DIAMETER SUCH THAT, UPON REACHING A CUT-OFF PORTION OF THE AXIAL PROTRUSION HAVING THE CUT-OFF SIZE, THE LIGHT IS REFLECTED AT THE CUT-OFF PORTION AND GENERATES AN EVANESCENT ELECTROMAGNETIC WAVE AT THE CUT-OFF PORTION

604 — MEASURING, FOR EACH RESPECTIVE OPTICAL FIBER CORE OF THE PLURALITY OF OPTICAL FIBER CORES, AN INTENSITY OF THE LIGHT REFLECTED FROM THE CUT-OFF PORTION OF THE RESPECTIVE OPTICAL FIBER CORE BY A CORRESPONDING LIGHT DETECTOR OPTICALLY CONNECTED TO THE RESPECTIVE OPTICAL FIBER CORE AT THE SECOND SIDE OF THE SUPPORT STRUCTURE

Figure 6

EVANESCENT WAVE BASED OPTICAL PROFILER ARRAY

BACKGROUND

Profilometry is a collection of techniques used to determine topological features of a surface of a sample. Among other surface attributes, the topological features may indicate height variations of the surface and textures of the surface. Thus, the topological features may be determined, for example, in order to measure a manufacturing quality of the sample and/or a degradation of the sample over time.

SUMMARY

An array of a plurality of optical fibers may be etched to define on one side thereof a plurality of conically-shaped spikes. This array of conically-shaped spikes may be used to measure distances between the spikes of the array and a surface of a sample. Specifically, a light emitter may be optically connected to the array of conically-shaped spikes at the unetched side thereof and configured to inject light thereinto. Due to each respective spike being tapered as a result of its conical shape, the respective spike may include, along its tapered section, a cut-off portion at which the light is reflected. Reflection of the light at the cut-off portion may generate an evanescent electromagnetic wave emanating from the cut-off portion. When a sample is brought sufficiently close to the cut-off portion, the evanescent electromagnetic wave may couple to the sample, resulting in tunneling of some of the light from the respective spike to the sample. The tunneling of the light may decrease the intensity of the reflected light, which may be measured by one or more light detectors optically connected to the spike array. Thus, the distance between each spike and the sample may be determined based on the measured intensity of the reflected light relative to the intensity of the emitted light.

In a first example embodiment, an apparatus is provided that includes a support structure that includes an optical fiber cladding and defines therein a plurality of substantially parallel cavities extending from a first side of the support structure to a second side of the support structure. The apparatus also includes a plurality of optical fiber cores. Each respective optical fiber core of the plurality of optical fiber cores (i) extends from the second side of the support structure through a corresponding cavity of the plurality of substantially parallel cavities and (ii) includes an axial protrusion that protrudes axially from the optical fiber cladding at the first side of the support structure. The axial protrusion of each respective optical fiber core tapers from a first diameter at the first side of the support structure down to a second diameter at an end of the axial protrusion. The apparatus additionally includes a light emitter optically connected to the plurality of optical fiber cores at the second side of the support structure and configured to emit light into the plurality of optical fiber cores. A cut-off size associated with the light is greater than or equal to the second diameter such that, upon reaching a cut-off portion of the axial protrusion having the cut-off size, the light is reflected at the cut-off portion and generates an evanescent electromagnetic wave at the cut-off portion. The apparatus further includes a plurality of light detectors. Each respective light detector of the plurality of light detectors is (i) optically connected at the second side of the support structure to a corresponding optical fiber core of the plurality of optical fiber cores and (ii) configured to measure an intensity of the light reflected from the cut-off portion of the corresponding optical fiber core.

In a second example embodiment, a method is provided that includes providing (i) a support structure that includes an optical fiber cladding and defining therein a plurality of substantially parallel cavities extending from a first side of the support structure to a second side of the support structure and (ii) a plurality of optical fiber cores. Each respective optical fiber core of the plurality of optical fiber cores extends from the second side of the support structure through a corresponding cavity of the plurality of substantially parallel cavities and includes an axial protrusion that protrudes axially from the optical fiber cladding at the first side of the support structure. The axial protrusion of each respective optical fiber core tapers from a first diameter at the first side of the support structure down to a second diameter at an end of the axial protrusion. The method also includes emitting light into the plurality of optical fiber cores by a light emitter optically connected to the plurality of optical fiber cores at the second side of the support structure. A cut-off size associated with the light is greater than or equal to the second diameter such that, upon reaching a cut-off portion of the axial protrusion having the cut-off size, the light is reflected at the cut-off portion and generates an evanescent electromagnetic wave at the cut-off portion. The method further includes measuring, for each respective optical fiber core of the plurality of optical fiber cores, an intensity of the light reflected from the cut-off portion of the respective optical fiber core by a corresponding light detector optically connected to the respective optical fiber core at the second side of the support structure.

In a third example embodiment, a non-transitory computer-readable storage medium is provided having stored thereon instructions that, when executed by a computing device, cause the computing device to perform operations. The operations include causing a light emitter to emit light into a plurality of optical fiber cores. The light emitter is optically connected to the plurality of optical fiber cores at a second side of a support structure. The support structure includes an optical fiber cladding and defines therein a plurality of substantially parallel cavities extending from a first side of the support structure to the second side of the support structure. Each respective optical fiber core of the plurality of optical fiber cores extends from the second side of the support structure through a corresponding cavity of the plurality of substantially parallel cavities and includes an axial protrusion that protrudes axially from the optical fiber cladding at the first side of the support structure. The axial protrusion of each respective optical fiber core tapers from a first diameter at the first side of the support structure down to a second diameter at an end of the axial protrusion. A cut-off size associated with the light is greater than or equal to the second diameter such that, upon reaching a cut-off portion of the axial protrusion having the cut-off size, the light is reflected at the cut-off portion and generates an evanescent electromagnetic wave at the cut-off portion. The operations also include receiving, from each respective light detector of a plurality of light detectors, a signal indicating an intensity of the light reflected from the cut-off portion of a corresponding optical fiber core. Each respective light detector of the plurality of light detectors is optically connected at the second side of the support structure to the corresponding optical fiber core. The operations further include determining, for each respective optical fiber core and based on the signal, a distance between the cut-off portion of the respective optical fiber core and a sample disposed adjacent to the end of the axial protrusion of the respective optical fiber core.

In a fourth example embodiment, a system is provided that includes a support structure means defining a plurality of substantially parallel cavities extending from a first side of the support structure means to a second side of the support structure means. The system also include a plurality of optical fiber means. Each respective optical fiber means of the plurality of optical fiber means (i) extends from the second side of the support structure means through a corresponding cavity of the plurality of substantially parallel cavities and (ii) includes an axial protrusion that protrudes axially from the support structure means at the first side of the support structure means. The axial protrusion of each respective optical fiber means tapers from a first diameter at the first side of the support structure means down to a second diameter at an end of the axial protrusion. The system additionally includes a light emitting means optically connected to the plurality of optical fiber means at the second side of the support structure means and configured to emit light into the plurality of optical fiber means. A cut-off size associated with the light is greater than or equal to the second diameter such that, upon reaching a cut-off portion of the axial protrusion having the cut-off size, the light is reflected at the cut-off portion and generates an evanescent electromagnetic wave at the cut-off portion. The system further includes a plurality of light detecting means. Each respective light detecting means of the plurality of light detecting means is (i) optically connected at the second side of the support structure means to a corresponding optical fiber means of the plurality of optical fiber means and (ii) configured to measure an intensity of the light reflected from the cut-off portion of the corresponding optical fiber means.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6 illustrates a flow chart, in accordance with example embodiments.

DETAILED DESCRIPTION

Figure 1A:
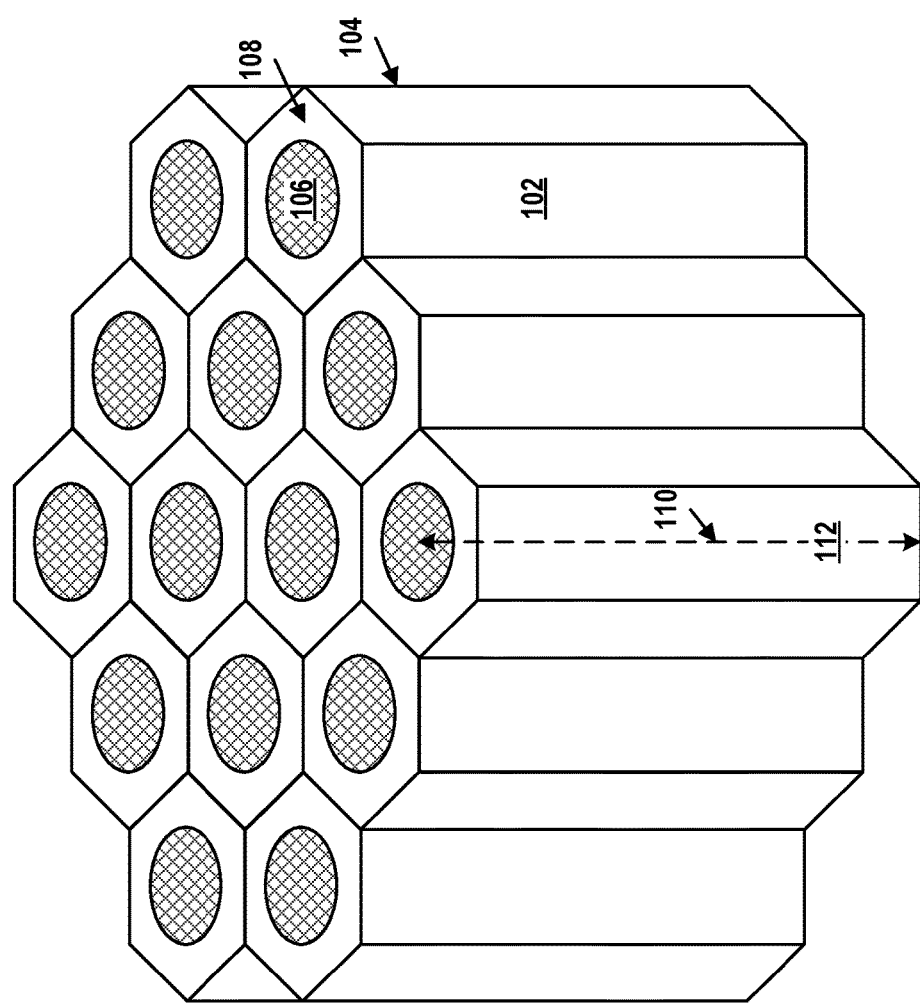
FIG. 1A illustrates a fiber array, in accordance with example embodiments.

Example methods, devices, and systems are described herein. It should be understood that the words "example" and "exemplary" are used herein to mean "serving as an example, instance, or illustration." Any embodiment or feature described herein as being an "example," "exemplary," and/or "illustrative" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order. Unless otherwise noted, figures are not drawn to scale.

I. OVERVIEW

An array of a plurality of conically-shaped spikes may be made from bundles of glass fibers. In one example, each glass fiber may include a circular core material surrounded by a cladding material. The outside of the cladding material may be circular or hexagonal, among other possibilities, and may define a support structure of the array. To form the array, the glass fibers may be bundled into an axially-aligned array, which may be stretched axially while being heated to fuse the fibers and reduce their diameter. The stretched array may then be cut perpendicularly to the glass fiber axes, and the process may be repeated with respect to the stretched and cut glass fiber array until the individual glass fibers are reduced to a desired size. With each iteration of bundling, stretching, and cutting, the diameter of the glass fibers may be reduced, but the aspect ratio of the core material to the cladding material may remain substantially constant.

Upon achieving an array of glass fibers having the desired size, at least one face of the array perpendicular to the axes of the glass fibers may be etched to create the conically-shaped spikes. Specifically, the core material and the cladding material may have different etching rates when subjected to an etchant, with an etching rate of the cladding material being greater than an etching rate of the core material. Thus, as the face of the array is exposed to the etchant, the cladding material may be removed at a higher rate than the core material, resulting in the core material being shaped into a substantially conical spike. The aspect ratio of the spike (e.g., the ratio of the height of the cone to a radius of the cone) may be based on the ratio of the etching rate of the cladding material to the etching rate of the core material. Thus, the aspect ratio of the spike may be controlled through selection of a particular combination of cladding material, core material, and/or etchant. In some cases, the resulting plurality of conically-shaped spikes may be atomically-sharp.

The array of conically-shaped spikes may be used to measure a height profile of a surface of a sample placed near the array based on tunneling of photons from the conically-shaped spikes to the sample. Specifically, the cladding material and the core material may be selected such that each glass fiber operates as an optical fiber configured to transmit, via total internal reflection and through at least a portion thereof, light having a particular range of frequencies. One or more light emitters may be optically connected to the plurality of optical fiber cores making up the array of conically-shaped spikes. Specifically, the conically-shaped spikes may protrude from a first (e.g., front) side of the array, and the one or more light emitters may be optically connected at a second (e.g., back) side of the array. The one or more light emitters may be configured to emit light into the plurality of optical fiber cores and the light may then travel from the second side of the array, through at least a portion of the plurality of optical fiber cores, and toward the first side of the array.

The light may be associated with a cut-off size that indicates a minimum size of the optical fiber core that allows for propagation of the light therethrough. That is, the light may propagate through the optical fiber core when the size (e.g., diameter, width, and/or height) of the optical fiber core is greater than or equal to the cut-off size, but might not propagate through the optical fiber core when the size of the optical fiber core is smaller than the cut-off size. Accordingly, since each respective conically-shaped spike is tapered from a first diameter (e.g., equal to a diameter of the optical fiber core) down to a second diameter, the diameter of the conically-shaped spike may, at a particular portion therealong, be equal to the cut-off size. The portion of the conically-shaped spike having a size corresponding to the cut-off size (e.g., a diameter equal to the cut-off diameter) may be referred to as a cut-off portion.

The light traveling through a respective optical fiber core may, upon reaching the cut-off portion of the corresponding conically-shaped spike, be reflected back towards the second side of the array. Reflection of the light may result in the generation of an evanescent electromagnetic wave at the reflection point (i.e., at the cut-off portion of the respective conically-shaped spike). The evanescent electromagnetic wave may have a maximum value at the cut-off portion and may decay exponentially along the axis of the respective optical fiber core in a direction from the second side to the first side (e.g., along the direction that the conically-shaped spike "points in"). Thus, the evanescent electromagnetic wave may be viewed as emanating from the respective conically-shaped spike starting at the cut-off portion.

When the respective conically-shaped spike is brought into proximity of a sample such that a surface of the sample coincides with or enters a region occupied by the evanescent electromagnetic wave, the evanescent electromagnetic wave may couple to the surface of the sample. As a result of this coupling, some of the light incident at the cut-off portion may tunnel from the respective conically-shaped spike to the sample. Thus, a smaller amount of light may be reflected back along the respective optical fiber core. Specifically, the amount of photon tunneling may depend on the distance between the cut-off portion and the sample, with more tunneling taking place as the distance is decreased. Accordingly, the amount of reflected light may be inversely proportional to the distance, with little to no light being reflected when the cut-off portion is in close proximity to the sample and most or all of the light being reflected when the cut-off portion is beyond a threshold distance of the sample.

A plurality of light detectors may be optically connected to the plurality of optical fiber cores at the second side of the array. Specifically, each light detector may be optically connected to a corresponding optical fiber core and may be configured to measure an intensity of the light reflected from the cut-off portion of the corresponding optical fiber core. In one example, the one or more light emitters may emit a light pulse and the plurality of light detectors may measure the intensity of the emitted light at a first time and/or the intensity of the reflected light at a second time later than the first time. The reflected light may be measured in multiple optical fiber cores in parallel. Based on the measured intensity of the reflected light, a control system may be configured to calculate the distance between the cut-off portion of the respective optical fiber core and a corresponding point on the surface of the sample. Thus, a height profile of the surface of the sample may be determined.

In one example, the array may be used to determine the height profile of the surface of the sample in sections. Specifically, with the array disposed over a first portion of the sample, the array may be used to determine the height profile of the first portion. The array may then be repositioned to other portions of the sample and the measurement may be repeated until the entire sample is measured. In another example, the array may be large enough to determine the height profile of the entire surface in one measurement and without repositioning the array.

The vertical position of the array may be adjustable to position the sample within the region occupied by the evanescent electromagnetic waves. The vertical position may be adjusted based on, for example, a distance measured using one or more of the optical fiber cores.

In general, an axial protrusion of the optical fiber core may be tapered to form the conically-shaped spike. Specifically, the optical fiber core may be tapered from the first diameter down to a second diameter. In some cases, the second diameter may be defined by an atomically-sharp tip of the conically-shaped spike. That is, the conically-shaped spike may be a cone, and the second diameter may be substantially equal to a diameter of an atom of the optical fiber core material. In other cases, the second diameter may be defined by etching away or otherwise removing a portion of the tip of the spike, such that the conically-shaped spike forms a tapered cylinder. In such a case, the conically-shaped spike may lack a tip and may instead have a flat face. By removing a portion of the spike tip, the cut-off portion may be positioned closer to an end of the conically-shaped spike, thus allowing the sample surface to be brought closer to a maximum of the evanescent electromagnetic wave, thereby improving the range of heights measurable by the array.

II. EXAMPLE ARRAY OF CONICALLY-SHAPED SPIKES

FIG. 1A illustrates glass fiber array 100 that includes a plurality of glass fibers. Glass fiber array 100 may alternatively be referred to as a glass fiber bundle. Glass fiber array 100 includes fourteen substantially identical glass fibers. In other implementations, more or fewer glass fibers may be used to form glass fiber array 100. Aspects of glass fiber 102, positioned at the bottom right portion of glass fiber array 100, and glass fiber 112, positioned at the bottom center of glass fiber array 100, are discussed herein as representative examples of the glass fibers in glass fiber array 100.

Glass fiber 102 may include core 106 surrounded by cladding 104. Core 106 may be alternatively referred to herein as a core material, an optical fiber core, and/or a protrusive phase matrix material. Cladding 104 may be alternatively referred to herein as a cladding material, an optical fiber cladding, and/or a recessive phase matrix material. FIG. 1A shows core 106 as having a circular cross-section. However, in other implementations, core 106 may have, for example, an elliptical cross-section or an n-gonal (e.g., hexagonal, octagonal, etc.) cross-section. Similarly, FIG. 1A shows the outside of cladding 104 as having a hexagonal cross-section. However, in other implementations, cladding 104 may have, for example, a circular cross-section, an elliptical cross-section, or another n-gonal (e.g., square, octagonal, decagonal, etc.) cross section.

The cladding of the plurality of glass fibers that forms glass fiber array 100 may collectively define and/or be referred to as a support structure of glass fiber array 100. That is, when the plurality of glass fibers in glass fiber array 100 is fused together, the support structure may be defined by the union of the cladding of the plurality of glass fibers. The support structure may include and/or define therein a plurality of substantially parallel cores, cavities, and/or voids through which the cores of glass fiber array 100 extend.

Glass fiber array 100 may be formed by bundling the plurality of glass fibers with their axes aligned side by side. Glass fiber axis 110 running through the core of glass fiber 112 illustrates the axial direction of glass fiber 112. The bundle of the plurality of glass fibers may be stretched axially (i.e., along axis 110) while being heated, resulting in the cladding material of the plurality of glass fibers fusing together and the glass fibers having their respective diameters reduced and their length increased. The stretched bundle may then be cut perpendicularly to the glass fiber axes (i.e., perpendicularly to axis 110). The process may be repeated with respect to the stretched and cut glass fiber bundle until the individual glass fibers reach a desired size (e.g., a desired diameter of core 106, a desired length of glass fiber 102, etc.) and/or the bundle reaches a desired size (e.g., the surface area of face 108 reaches a threshold surface area). With each iteration of bundling, stretching, and cutting, the diameter of the glass fibers may be reduced and the length may be increased, but an aspect ratio of core 106 to cladding 104 (e.g., core 106 radius to cladding 104 radius) may remain substantially constant.

Figure 1B:
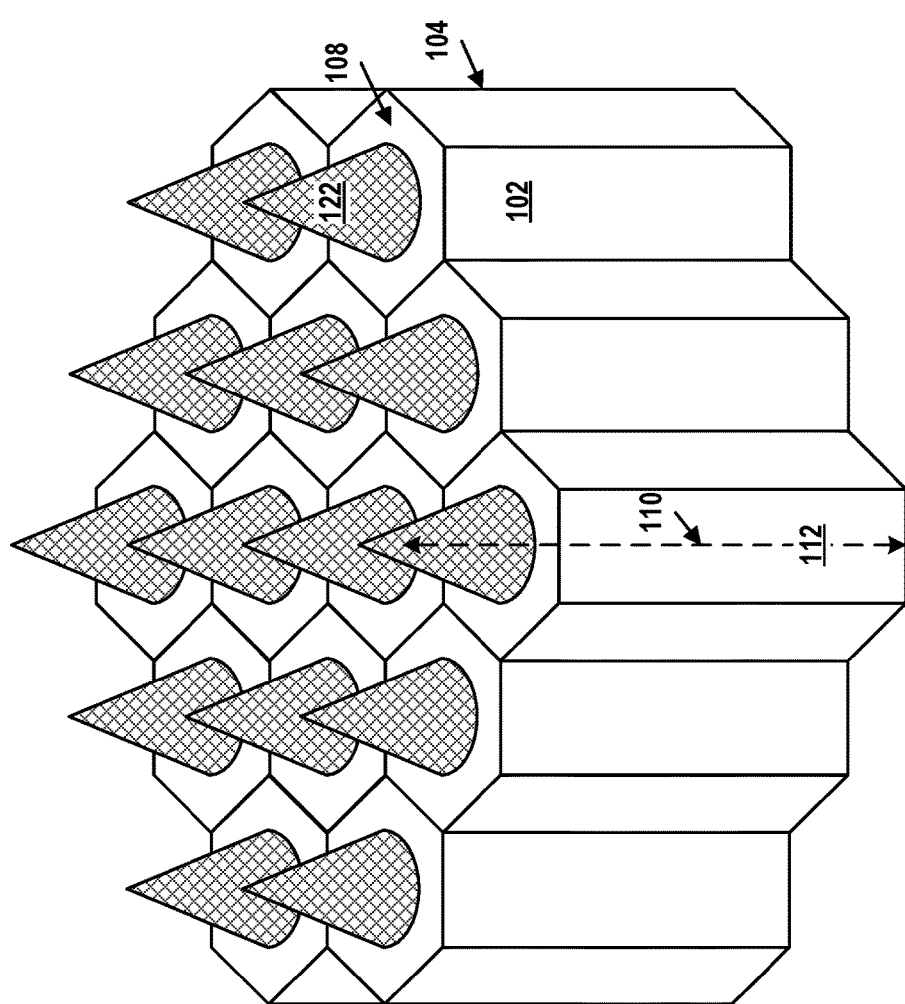
FIG. 1B illustrates a spike array, in accordance with example embodiments.

When glass fiber array 100 and/or the fibers therein achieve a desired size, at least one face of glass fiber array 100 may be etched to create an array of conically-shaped spikes. For example, face 108, which is perpendicular to the axes of the glass fibers (e.g., axis 110), may be etched, resulting in formation of spike array 120, as illustrated in FIG. 1B. Spike array 120 may include a plurality of conically-shaped spikes protruding from face and/or side 108. Each respective spike of spike array 120 may include a portion of a corresponding core radially surrounded by corresponding cladding and a corresponding axial protrusion (formed from the core) that, due to the etching, is no longer radially surrounded by the corresponding cladding. The axial protrusion may be tapered and thus define the conically-shaped end of the spike. In some embodiments, the axial protrusion may be substantially conical and may have a radius defined by a radius of the core. In other embodiments, the axial protrusion may be a tapered cylinder having, at the end proximate to face 108, a first radius defined by a radius of the core and a second smaller radius at the distal end.

Specifically, taking spike 122 as a representative example, the materials of core 106 and cladding 104 may be selected to have different etching rates when subjected to a particular etchant. An etching rate of cladding 104 may be greater than an etching rate of core 106. Thus, as face 108 of glass fiber array 100 is exposed to the etchant, cladding 104 may be removed at a higher rate than core 106, resulting in core 106 being shaped into a substantially conical spike. Thus, glass fiber 102 may be etched to form conically-shaped spike 122. Spike 122 may include a portion of core 106 that, after etching, remains surrounded by cladding 104 and thus connects, mounts, and/or attaches spike 122 to the support structure. Spike 122 may also include an axial protrusion defined by etching core 106 to form a substantially-conical shape. Because the axial protrusion begins to form due in part to cladding 104 being etched away, the axial protrusion might not be surrounded by any cladding material.

The aspect ratio of spike 122 (e.g., the ratio of the height of the cone protruding from face 108 to a radius of the cone) may be based on an etching rate ratio of the etching rate of cladding 104 to the etching rate of core 106. For example, as the etching rate ratio is decreased, spike 122 may become flattened (i.e., height/radius may decrease), and as the etching rate ratio is increased, spike 122 may become more pointy (i.e., height/radius may increase). In one example, aspect ratios of 0.3 height-to-base to 30 height-to-base may be achieved, although smaller and/or larger height-to-base ratios may be achievable as well. Thus, the aspect ratio of the spikes may be controlled through selection of a particular combination of the cladding material, the core material, and/or the etchant. In some cases, the resulting plurality of conically-shaped spikes may be atomically-sharp. That is, the tip of each cone may be defined by a single atom and/or molecule of the core material.

Within examples, the etchant may include: organic acids, inorganic acids (e.g., HF, HCl, HBr, or HI), organic alkalis, inorganic alkalis, polar solvents, nonpolar solvents, organic solvents, inorganic solvents, and/or mixtures of any of the foregoing. For example, dilute HF (e.g., 5%) and/or a buffered HF may be used to vary the differential etch rate and thus the aspect ratio of the conically-shaped spikes. The etchant can be a mixed etchant system that includes a mixture of a plurality of etchants that give different etch contrast ratios when applied to glass fiber array 100. For example, one etchant can preferentially etch core 106 while the other etchant can preferentially etch cladding 104. A mixed etchant system may allow for modification of the contrast ratio of the etching process by changing the composition and/or relative concentrations of the etchants. An example of a mixed etchant system is a mixture of HF and HCl.

III. EXAMPLE EVANESCENT WAVE GENERATION

Figure 2:
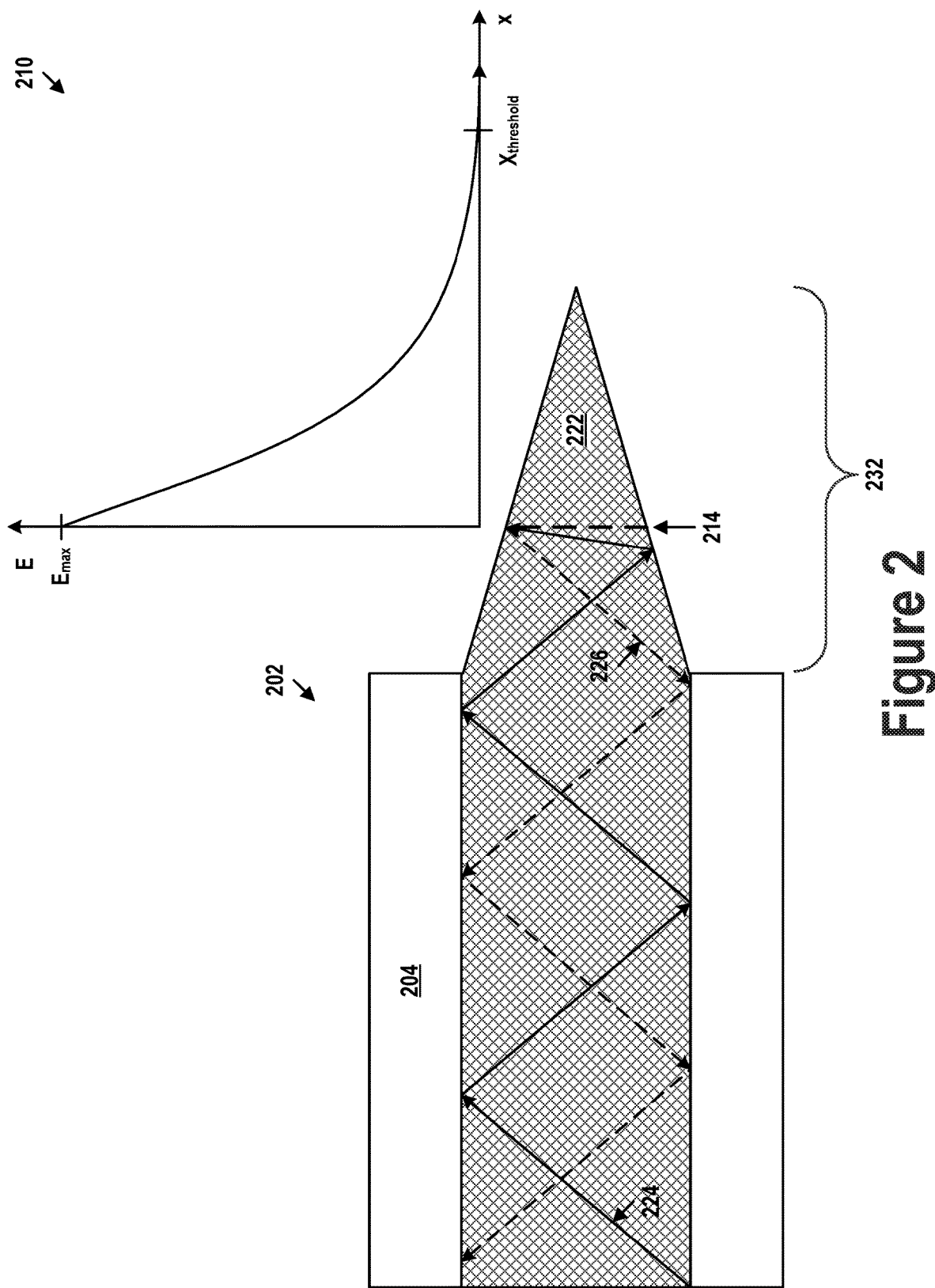
FIG. 2 illustrates aspects of an evanescent electromagnetic wave, in accordance with example embodiments.

Spike array 120 and/or variations thereof may be used to determine a height profile of a sample. FIG. 2 illustrates how each respective spike in spike array 120 may be used to determine a distance between the respective spike and a portion of a surface of a sample. Specifically, FIG. 2 illustrates glass fiber 202, which includes spike 222 and optical fiber cladding 204. Spike 222 and optical fiber cladding 204 are discussed herein as representative examples of the conically-shaped spikes of spike array 120 and the other spike arrays discussed herein. Spike 222 is partially surrounded by optical fiber cladding 204 and includes axial protrusion 232 extending beyond optical fiber cladding 204.

Spike 222 may be configured to transmit therethrough light 224, which is indicated with solid lines. Light 224 may be injected into spike 222 at the left end thereof as drawn in FIG. 2, which may correspond to a bottom side (i.e., the unetched side) of spike array 120. Light 224 may travel through spike 222 via total internal reflection. As light 224 reaches axial protrusion 232 of spike 224, the angle relative to normal at which light 224 is reflected may begin to decrease due to the tapering of axial protrusion 232. Eventually, upon reaching cut-off portion 214, light 224 may, due to the tapering of axial protrusion 232, be reflected from cut-off portion 214. The reflection of light 224 from cut-off portion 214 is represented by reflected light 226, indicated with dashed lines. The position of cut-off portion 214 along spike 222 may depend on the wavelength of light 224, the diameter of the optical fiber core from which spike 222 is formed, and/or the aspect ratio of spike 222, among other parameters. In some cases, the position of cut-off portion 214 may be determined computationally (e.g., by way of simulation and/or calculation) before spike 222 is formed and/or experimentally after spike 222 is formed.

As a result of the reflection of light 224 from cut-off portion 214, an evanescent electromagnetic wave may be generated emanating from cut-off portion 214 along the axial direction of spike 222. Specifically, as illustrated by graph 210, a maximum $E_{max}$ of an electric field associated with the evanescent electromagnetic wave may be located at cut-off portion 214. The magnitude of the electric field associated with the evanescent electromagnetic wave may decrease or decay exponentially (e.g., as a function of the natural logarithm) along the axial direction, corresponding to the x-axis of graph 210, of spike 222. Thus, upon reaching threshold distance/position $x_{threshold}$, the magnitude of the electric field associated with the evanescent electromagnetic wave may decrease to approximately zero (e.g., to less than 1% of maximum $E_{max}$). The value of the threshold distance/position $x_{threshold}$ may be based at least in part of the maximum value $E_{max}$ of the evanescent electromagnetic wave which, in turn, may be based on the intensity of light 224. Thus, the value of the threshold distance/position $x_{threshold}$ may be increased by increasing the intensity of light 224 injected into spike 222.

When axial protrusion 232 of spike 222 is brought close to a surface of a sample, the evanescent electromagnetic wave may couple to the surface of the sample. Specifically, coupling may occur when the distance between cut-off portion 214 and the surface is less than the threshold distance $x_{threshold}$ (i.e., when the surface is placed to the left of threshold position $x_{threshold}$). That is, coupling may occur when the magnitude of the evanescent electromagnetic wave is greater than approximately zero, and the evanescent electromagnetic wave "permeates" and/or intersects the surface.

Coupling of the evanescent electromagnetic wave may result in tunneling of photons from spike 222 to the sample. Specifically, when the sample is beyond threshold distance $x_{threshold}$ relative to cut-off portion 214 (i.e., to the right of threshold position $x_{threshold}$, as shown in FIG. 2) tunneling might not take place. Thus, the intensity of reflected light 226 may be equal to the intensity of light 224. As the sample is brought within threshold distance $x_{threshold}$ relative to cut-off portion 214 (i.e., between cut-off portion 214 and threshold position $x_{threshold}$, as shown in FIG. 2), a first portion of light 224 may be reflected, thus generating reflected light 226, and a second portion of light 224 may tunnel to the sample. As the sample is brought close to cut-off portion 214, the amount of tunneling may increase exponentially according to graph 210. As the amount of photon tunneling increases, the intensity of reflected light 226 relative to the intensity of light 224 may proportionally decrease. Thus, if the surface of the sample is placed at cut-off portion 214, most or all of light 224 tunnels to the sample, resulting in little to no reflected light 226.

Accordingly, by measuring the intensity of reflected light 226, the distance between cut-off portion 214 and the surface of the sample may be determined. Specifically, the intensity of reflected light 226 (e.g., relative to the intensity of light 224) may vary as a function of the distance according to the relationship shown in graph 210, where the maximum magnitude $E_{max}$ of the evanescent electromagnetic wave is based on the intensity of light 224. That is, the intensity of reflected light 226 relative to the intensity of light 224 may decrease exponentially as the distance between cut-off portion 214 and the sample surface increases, with the maximum value thereof being based on the intensity of light 224.

IV. EXAMPLE ARRAY OF CONICALLY-SHAPED SPIKES WITHOUT TIPS

When the spikes of spike array 120 include their respective tips (i.e., the axial protrusions are cones rather than tapered cylinders), part of the measurable distance range may be taken up by the respective tips. Specifically, as illustrated in FIG. 2, the measurable distance range includes the region between cut-off portion 214 and the threshold position $x_{threshold}$. The sample may be positionable between the tip of the axial protrusion of spike 222 and the threshold position $x_{threshold}$, but the sample might not be positionable between the tip and cut-off portion 214 since that region is occupied by the tip. Accordingly, removing a portion of the tip upstream of cut-off portion 214 (i.e., to the right of cut-off portion 214, as drawn in FIG. 2) may increase the distance range that can be measured by spike array 120 by allowing the sample to be brought closer to the cut-off portion 214.

Figure 3:
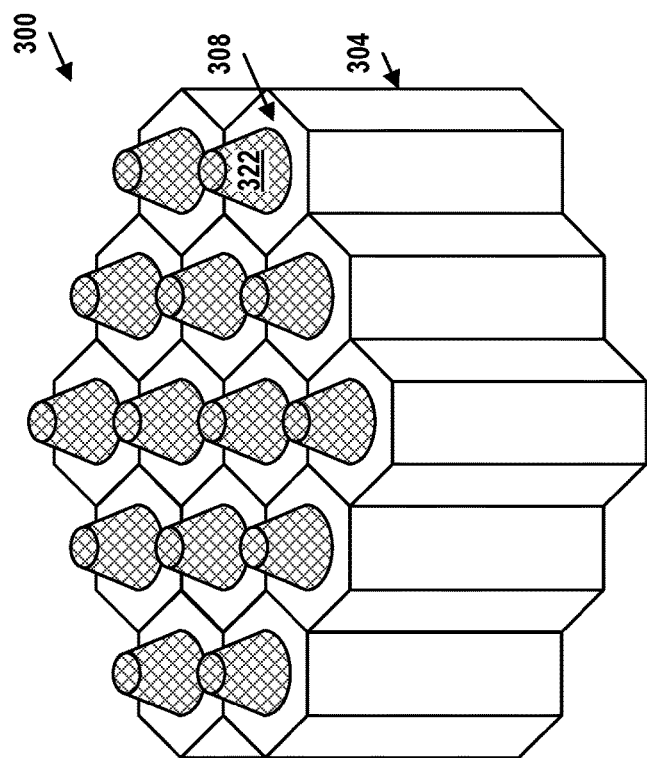
FIG. 3 illustrates a spike array, in accordance with example embodiments.
Figure 3:
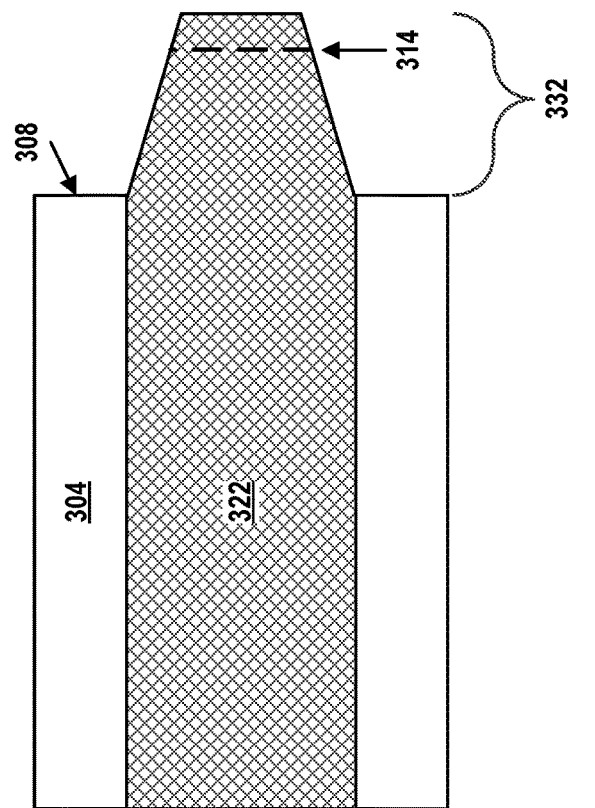

Accordingly, FIG. 3 illustrates spike array 300 that includes a plurality of conically-shaped spikes with their respective tips removed. Thus, the respective axial protrusion of each conically-shaped spike in array 300 forms a tapered cylinder, rather than a cone. Specifically, as illustrated by the cross section of spike 322, which is provided as a representative example of the spikes in array 300, the "sharp" end of axial protrusion 332 is removed upstream of cut-off portion 314 (i.e., to the right of cut-off portion 314, as drawn in FIG. 3). Thus, axial protrusion 332 forms a cylinder that tapers from a first diameter at face 308 of cladding 304 to a second smaller diameter at the end of axial protrusion 332 (i.e., at the right side of axial protrusion 332, as shown in FIG. 3). The diameter of cut-off portion 314 is smaller than the first diameter and larger than the second diameter. That is, cut-off portion 314 is not removed by the removal of the spike tips, thereby allowing spike 322 to continue to reflect light from cut-off portion 314.

In some implementations, the second diameter of axial protrusion 332 may be selected such that it is slightly larger than the diameter associated with cut-off portion 314. This may allow cut-off portion 314 to be brought closer to the surface of the sample, thus increasing the measurable distance range. Additionally, making the second diameter slightly larger than the diameter associated with cut-off portion 314 allows more measurements to take place in the region of graph 210 near where the electric field of the evanescent electromagnetic wave is at its highest. Alternatively or additionally, in some implementations, the height to base aspect ratio of spike 322 may be decreased so as to increase the rate at which spike 322 tapers down, thereby placing the cut-off portion closer to the tip of axial protrusion 332 (i.e., the right end of axial protrusion, as drawn in FIG. 3) by "flattening" axial protrusion 332.

V. EXAMPLE SYSTEMS

Figure 4:
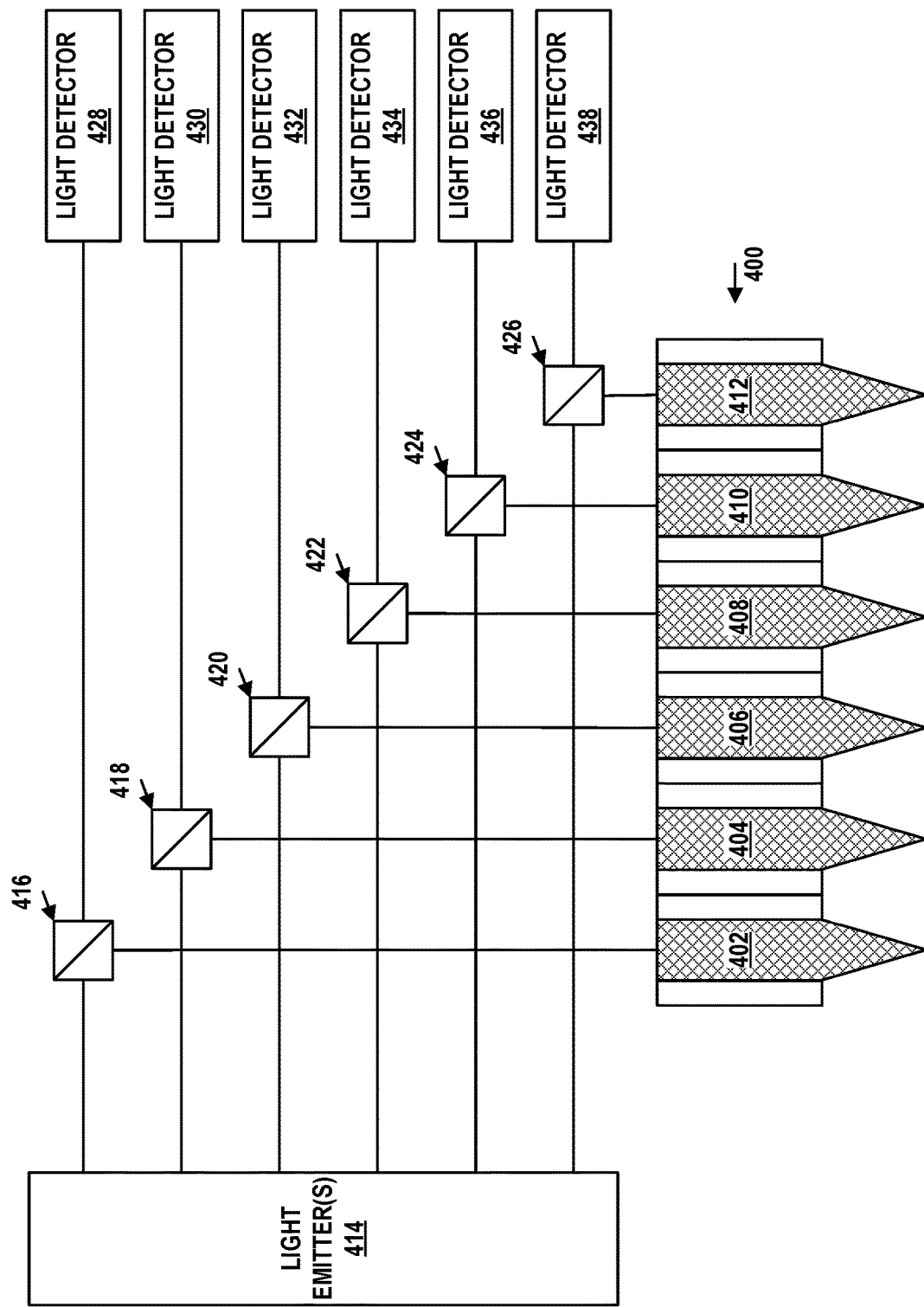
FIG. 4 illustrates a spike array connected to a light emitter and light detectors, in accordance with example embodiments.

FIG. 4 illustrates an example arrangement of a spike array, one or more light emitters, and light detectors for generating evanescent electromagnetic waves and measuring the extent of coupling thereof to samples. Specifically, spike array 400, which may be similar to spike array 120, may include spikes 402-412 (i.e., spikes 402, 404, 406, 408, 410, and 412), as well as other spikes that are not shown by the cross-sectional view. Spikes 402-412 may be optically connected to light emitter(s) 414 by way of signal splitters 416-426 (signal splitters 416, 418, 420, 422, 424, and 426). Spikes 402-412 may also be optically connected to light detectors 428-438 (i.e., light detectors 428, 430, 432, 434, 436, and 438) by way of signal splitters 416-426.

Light emitter(s) 414 may include one or more light emitting devices configured to emit light having a corresponding range of frequencies. For example, light emitter(s) 414 may include light emitting diodes (LEDs), and/or laser light sources, among other possibilities. In some implementations, light emitter(s) 414 may include a corresponding light emitter for each of spikes 402-412. Light detectors 428-438 may include combinations of one or more of charge coupled devices (CCDs), complementary metal oxide semiconductor (CMOS) light sensing devices, avalanche photodiodes (APDs), single-photon avalanche diodes (SPADs), silicon photomultipliers (SiPM), among others.

Light emitter(s) 414 may be configured to emit light towards signal splitters 416-426, each of which may direct a respective first portion of the light towards a corresponding light detector of light detectors 428-438 and a respective second portion of the light towards a corresponding spike of spikes 402-412. For example, signal splitter 416 may direct the first portion of the light incident thereon from light emitter(s) 414 towards light detector 428, which may determine a baseline intensity of the light, and the second portion towards spike 402. Similarly, signal splitter 418 may direct the first portion of the light incident thereon from light emitter(s) 414 towards light detector 430, which may determine a baseline intensity of the light, and the second portion towards spike 404.

The respective second portion of the light may travel through the corresponding spike and, upon reaching the cut-off portion thereof, be reflected at the cut-off portion and travel back towards the corresponding signal splitter. For example, after reflection from the cut-off portion of spike 406, the reflected light may travel towards signal splitter 420, where it might again be split into two portions. A first portion of the reflected light may be directed towards light detector 432, while a second portion of the reflected light may be directed toward light emitter(s) 414. Light detector 432 may measure the intensity of the first portion of the reflected light, which may be indicative of a distance between the cut-off portion of spike 406 and the surface of a sample placed nearby. The second portion of the reflected light might not be used. Light detectors 428, 430, 434, 436, and 438 may similarly be used to measure the intensity of the respective first portion of the reflected light for spikes 402, 404, 408, 410, and 412, respectively.

In some implementations, signal splitters 416-426 may each be electrically controllable to vary the split ratio of the light incident thereon. For example, signal splitters 416-426 may be controlled to direct 0-100% of the light emitted by light emitter(s) 414 towards spikes 402-412, with any remaining light being directed towards light detectors 428-438 (e.g., 60% towards spikes 402-412 and 40% towards light detectors 428-438). Similarly, For example, signal splitters 416-426 may be controlled to direct 0-100% of the light reflected from spikes 402-412 towards light detectors 428-438, with any remaining light being directed towards light emitter(s) 414 (e.g., 100% towards light detectors 428-438 and 0% towards light emitter(s) 414).

In some embodiments, light emitter(s) 414 may emit the light in periodic pulses, allowing light detectors 428-438 to distinguish light emitted by light emitter(s) 414 from light reflected by spikes 402-412 based on the arrival time of the light. In other embodiments, light emitter(s) 414 may emit the light continuously while varying the frequency of the emitted light, thus allowing light detectors 428-438 to distinguish light emitted by light emitter(s) 414 from light reflected by spikes 402-412 based on the frequencies thereof.

Figure 5:
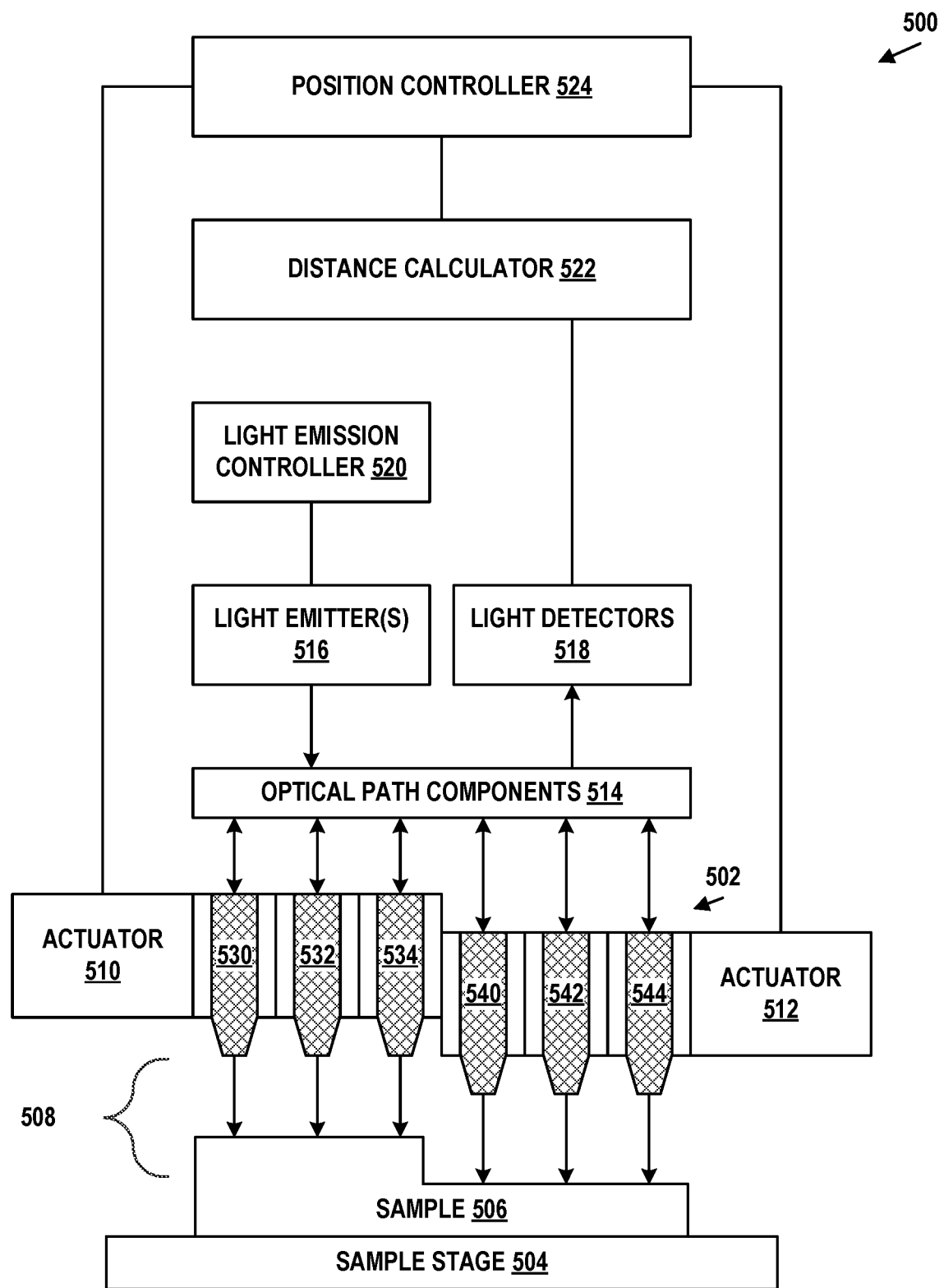
FIG. 5 illustrates an optical profilometry system, in accordance with example embodiments.

FIG. 5 illustrates an example profilometry system for determining a height profile of a sample using a spike array. Specifically, FIG. 5 illustrates profilometry system 500 that includes spike array 502, which may be similar to spike array 300 at least in that the spikes thereof are tapered cylinders (i.e., cones with their tips removed), rather than cones. Profilometry system 500 includes sample stage 504 on which sample 506 may be disposed, actuators 510 and 512, optical path components 514, light emitter(s) 516, light detectors 518, light emission controller 520, distance calculator 522, and position controller 524.

Light emitter(s) 516 may represent and/or correspond to light emitter(s) 414 of FIG. 4. Similarly, light detectors 518 may represent and/or correspond to light detectors 428-438 of FIG. 4. Optical path components 514 may represent and/or correspond to signal splitters 416-426 and/or other components configured to control an optical path of light. Light emission controller 520 may be configured to control light emitter(s) 516 to emit light at particular times and/or with particular frequencies.

Distance calculator 522 may be configured to determine the distance between each of spikes 530, 532, 534, 540, 542, and 544 and corresponding portions of sample 506 based on signals generated by light detectors 518. Specifically, distance calculator 522 may be configured to determine the distances based on the intensity of the light reflected by each spike, as measured by light detectors 518, in relation to the intensity of the light emitted by light emitter(s) 516. The intensity of the light reflected by each spike may be inversely proportional to the extent of photon tunneling 508 between the spikes in spike array 502 and sample 506, with the intensity of the reflected light decreasing as the extent of photon tunneling 508 increases. The extent of photon tunneling 508 may decrease exponentially from a maximum value as the distance between spikes of spike array 502 and sample 506 increases. Distance calculator 522 may thus calculate the distances based on this exponential relationship between the distance and reflected light intensity, where the reflected light intensity decays exponentially as sample 506 is brought closer to the spikes of spike array 502.

Position controller 524 may be configured to determine one or more horizontal and/or vertical adjustments to the position of spike array 502 based on the distances determined by distance calculator 522. The vertical adjustments may position spike array 502 relative to sample 506 such that the evanescent electromagnetic waves couple to the top surface of sample 506. The horizontal adjustments may position spike array 502 over different portions of sample 506 the entire top surface of sample 506 is scanned. In cases where spike array 502 spans an area greater than that spanned by sample 506, spike array 502 might not be repositioned and sample 506 may instead be measured in one shot. Based on these adjustments, position controller 524 may be configured to provide a control signal to actuator 510 and/or actuator 512, which may reposition portions of spike array 502 accordingly.

In some implementations, spike array 502 may be divided into two or more groups, each of which is vertically repositionable independently of the other groups. Thus, spike array 502 includes a first group of spikes that includes spikes 530, 532, and 534, and a second group of spikes that includes spikes 540, 542, and 544. Actuator 510 may be configured to vertically reposition the first group of spikes, while actuator 512 may be configured to (independently) vertically reposition the second group spikes. Thus, different groups of spikes may be positioned at different vertical heights to accommodate height variations in the surface of sample 506.

For example, as illustrated in FIG. 5, spikes 530, 532, and 534 may be positioned higher than spikes 540, 542, and 544 to measure the raised portion of sample 506 while spikes 540, 542, and 544 measure the lowered portion of sample 506. By adjusting the vertical positions of different spike groups independently, spike array 502 may allow for measurement of height variations that would otherwise exceed the measurable range of a spike array with spike groups that are vertically fixed relative to one another. In calculating the distance associated with each of the spikes in array 502, distance calculator 522 may be configured to account for the relative positioning between different spike groups in array 502.

VI. ADDITIONAL EXAMPLE OPERATIONS

FIG. 6 illustrates a flow chart of operations related to measuring one or more distances using an array of conically-shaped spikes. The embodiments of FIG. 6 may be simplified by the removal of any one or more of the features shown therein. Further, these embodiments may be combined with features, aspects, and/or implementations of any of the previous figures or otherwise described herein.

Block 600 may include providing (i) a support structure that includes an optical fiber cladding and defines therein a plurality of substantially parallel cavities extending from a first side of the support structure to a second side of the support structure and (ii) a plurality of optical fiber cores. Each respective optical fiber core of the plurality of optical fiber cores may extend from the second side of the support structure through a corresponding cavity of the plurality of substantially parallel cavities and may includes an axial protrusion that protrudes axially from the optical fiber cladding at the first side of the support structure. The axial protrusion of each respective optical fiber core may taper from a first diameter at the first side of the support structure down to a second diameter at an end of the axial protrusion.

Block 602 may include emitting light into the plurality of optical fiber cores by a light emitter optically connected to the plurality of optical fiber cores at the second side of the support structure. A cut-off size associated with the light may be greater than or equal to the second diameter such that, upon reaching a cut-off portion of the axial protrusion having the cut-off size, the light is reflected at the cut-off portion and generates an evanescent electromagnetic wave at the cut-off portion.

Block 604 may include measuring, for each respective optical fiber core of the plurality of optical fiber cores, an intensity of the light reflected from the cut-off portion of the respective optical fiber core by a corresponding light detector optically connected to the respective optical fiber core at the second side of the support structure.

In some embodiments, when the cut-off portion is placed within a threshold distance of a sample, the evanescent electromagnetic wave may couple to the sample such that a portion of the light reflected at the cut-off portion tunnels to the sample. The intensity of the light reflected from the cut-off portion may be inversely proportional to a distance between the cut-off portion and the sample.

In some embodiments, the threshold distance may be based on an intensity of the light emitted into the plurality of optical fiber cores by the light emitter.

In some embodiments, the evanescent electromagnetic wave may have a maximum value at the cut-off portion and may decay exponentially along a direction normal to the first side of the support structure and directed away from the second side of the support structure.

In some embodiments, a signal indicating the intensity of the light reflected from the cut-off portion of the respective optical fiber core may be received from the corresponding light detector of each respective optical fiber core. A distance between the cut-off portion of the respective optical fiber core and a sample disposed adjacent to the end of the axial protrusion of the respective optical fiber core may be determined for each respective optical fiber core based on the signal.

In some embodiments, a height profile of a surface of the sample may be determined based on the distance determined for each respective optical fiber core and relative positions of the plurality of optical fiber cores.

In some embodiments, an area of the first side spanned by the plurality of optical fiber cores and the support structure may exceed an area of a surface of the sample such that a height profile of the surface of the sample is determinable while the plurality of optical fiber cores remain horizontally fixed with respect to the sample.

In some embodiments, a height profile of a first portion of a surface of the sample may be determined based on the distance determined for each respective optical fiber core. An actuator may be caused to reposition the support structure and the plurality of optical fiber cores horizontally relative to the sample to determine a height profile of a second portion of the surface of the sample different from the first portion.

In some embodiments, a signal indicating the intensity of the light reflected from the cut-off portion of a first optical fiber core may be received from a first light detector corresponding to the first optical fiber. Based on the signal, a distance between the cut-off portion of the first optical fiber core and a sample disposed adjacent to the end of the axial protrusion of the corresponding optical fiber core may be determined. An actuator may be caused to reposition the support structure and the plurality of optical fiber cores vertically relative to the sample to position the support structure and the plurality of optical fiber cores for scanning of the sample.

In some embodiments, the support structure may include a plurality of support structure groups. Each respective support structure group of the plurality of support structure groups may be associated with a respective group of optical fiber cores. A vertical position of each respective support structure group may be independently repositionable based on height variations of a surface of a sample. Thus, a vertical position of a particular support structure group may be adjusted independently of at least one other support structure group based on height variations of a surface of sample.

In some embodiments, the axial protrusion of each respective optical fiber core may include a conically-shaped spike protruding from the first side of the support structure.

In some embodiments, the conically-shaped spike may be atomically-sharp such that the second diameter is determined by a diameter of a single atom of the respective optical fiber core.

In some embodiments, the axial protrusion of each respective optical fiber core may include a tapered cylinder protruding from the first side of the support structure.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical operations or actions in the method or technique. The program code and/or related data may be stored on any type of computer readable medium such as a storage device including random access memory (RAM), a disk drive, a solid state drive, or another storage medium.

The computer readable medium may also include non-transitory computer readable media such as computer readable media that store data for short periods of time like register memory, processor cache, and RAM. The computer readable media may also include non-transitory computer readable media that store program code and/or data for longer periods of time. Thus, the computer readable media may include secondary or persistent long term storage, like read only memory (ROM), optical or magnetic disks, solid state drives, compact-disc read only memory (CD-ROM), for example. The computer readable media may also be any other volatile or non-volatile storage systems. A computer readable medium may be considered a computer readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. An apparatus comprising:
a support structure comprising an optical fiber cladding and defining therein a plurality of substantially parallel cavities extending from a first side of the support structure to a second side of the support structure;
a plurality of optical fiber cores, wherein each respective optical fiber core of the plurality of optical fiber cores (i) extends from the second side of the support structure through a corresponding cavity of the plurality of substantially parallel cavities and (ii) includes an axial protrusion that protrudes axially from the optical fiber cladding at the first side of the support structure, wherein the axial protrusion of each respective optical fiber core tapers from a first diameter at the first side of the support structure down to a second diameter at an end of the axial protrusion;
a light emitter optically connected to the plurality of optical fiber cores at the second side of the support structure and configured to emit light into the plurality of optical fiber cores, wherein a cut-off size associated with the light is greater than or equal to the second diameter such that, upon reaching a cut-off portion of the axial protrusion having the cut-off size, the light is reflected at the cut-off portion and generates an evanescent electromagnetic wave at the cut-off portion; and
a plurality of light detectors, wherein each respective light detector of the plurality of light detectors is (i) optically connected at the second side of the support structure to a corresponding optical fiber core of the plurality of optical fiber cores and (ii) configured to measure an intensity of the light reflected from the cut-off portion of the corresponding optical fiber core.

2. The apparatus of claim 1, wherein, when the cut-off portion is placed within a threshold distance of a sample, the evanescent electromagnetic wave is configured to couple to the sample such that a portion of the light reflected at the cut-off portion tunnels to the sample, wherein the intensity of the light reflected from the cut-off portion is inversely proportional to a distance between the cut-off portion and the sample.

3. The apparatus of claim 2, wherein the threshold distance is based on an intensity of the light emitted into the plurality of optical fiber cores by the light emitter.

4. The apparatus of claim 1, wherein the evanescent electromagnetic wave has a maximum value at the cut-off portion and decays exponentially along a direction normal to the first side of the support structure and directed away from the second side of the support structure.

5. The apparatus of claim 1, further comprising:
a control system configured to perform operations comprising:
receiving, from each respective light detector, a signal indicating the intensity of the light reflected from the cut-off portion of the corresponding optical fiber core; and
determining, for each respective optical fiber core and based on the signal, a distance between the cut-off portion of the respective optical fiber core and a sample disposed adjacent to the end of the axial protrusion of the respective optical fiber core.

6. The apparatus of claim 5, wherein the operations further comprise:
determining a height profile of a surface of the sample based on the distance determined for each respective optical fiber core and relative positions of the plurality of optical fiber cores.

7. The apparatus of claim 5, wherein an area of the first side spanned by the plurality of optical fiber cores and the support structure exceeds an area of a surface of the sample such that a height profile of the surface of the sample is determinable while the plurality of optical fiber cores remain horizontally fixed with respect to the sample.

8. The apparatus of claim 5, wherein the operations further comprise:
determining, based on the distance determined for each respective optical fiber core, a height profile of a first portion of a surface of the sample; and
causing an actuator to reposition the support structure and the plurality of optical fiber cores horizontally relative to the sample to determine a height profile of a second portion of the surface of the sample different from the first portion.

9. The apparatus of claim 1, further comprising:
a control system configured to perform operations comprising:
receiving, from a first light detector of the plurality of light detectors, a signal indicating the intensity of the light reflected from the cut-off portion of the corresponding optical fiber core;
determining, based on the signal, a distance between the cut-off portion of the corresponding optical fiber core and a sample disposed adjacent to the end of the axial protrusion of the corresponding optical fiber core; and
causing an actuator to reposition the support structure and the plurality of optical fiber cores vertically relative to the sample to position the support structure and the plurality of optical fiber cores for scanning of the sample.

10. The apparatus of claim 1, wherein the support structure comprises a plurality of support structure groups, wherein each respective support structure group of the plurality of support structure groups is associated with a respective group of optical fiber cores, and wherein a vertical position of each respective support structure group is independently repositionable based on height variations of a surface of a sample.

11. The apparatus of claim 1, wherein the axial protrusion of each respective optical fiber core comprises a conically-shaped spike protruding from the first side of the support structure.

12. The apparatus of claim 11, wherein the conically-shaped spike is atomically-sharp such that the second diameter is determined by a diameter of a single atom of the respective optical fiber core.

13. The apparatus of claim 1, wherein the axial protrusion of each respective optical fiber core comprises a tapered cylinder protruding from the first side of the support structure.

14. A method comprising:
providing (i) a support structure comprising an optical fiber cladding and defining therein a plurality of substantially parallel cavities extending from a first side of the support structure to a second side of the support structure and (ii) a plurality of optical fiber cores, wherein each respective optical fiber core of the plurality of optical fiber cores extends from the second side of the support structure through a corresponding cavity of the plurality of substantially parallel cavities and includes an axial protrusion that protrudes axially from the optical fiber cladding at the first side of the support structure, wherein the axial protrusion of each respective optical fiber core tapers from a first diameter at the first side of the support structure down to a second diameter at an end of the axial protrusion;
emitting light into the plurality of optical fiber cores by a light emitter optically connected to the plurality of optical fiber cores at the second side of the support structure, wherein a cut-off size associated with the light is greater than or equal to the second diameter such that, upon reaching a cut-off portion of the axial protrusion having the cut-off size, the light is reflected at the cut-off portion and generates an evanescent electromagnetic wave at the cut-off portion; and
measuring, for each respective optical fiber core of the plurality of optical fiber cores, an intensity of the light reflected from the cut-off portion of the respective optical fiber core by a corresponding light detector optically connected to the respective optical fiber core at the second side of the support structure.

15. The method of claim 14, wherein, when the cut-off portion is placed within a threshold distance of a sample, the evanescent electromagnetic wave is configured to couple to the sample such that a portion of the light reflected at the cut-off portion tunnels to the sample, wherein the intensity of the light reflected from the cut-off portion is inversely proportional to a distance between the cut-off portion and the sample.

16. The method of claim 14, further comprising:
receiving, from the corresponding light detector of each respective optical fiber core, a signal indicating the intensity of the light reflected from the cut-off portion of the respective optical fiber core; and determining, for each respective optical fiber core and based on the signal, a distance between the cut-off portion of the respective optical fiber core and a sample disposed adjacent to the end of the axial protrusion of the respective optical fiber core.

17. The method of claim 16, further comprising:
determining a height profile of a surface of the sample based on the distance determined for each respective optical fiber core and relative positions of the plurality of optical fiber cores.

18. The method of claim 16, wherein an area of the first side spanned by the plurality of optical fiber cores and the support structure exceeds an area of a surface of the sample such that a height profile of the surface of the sample is determinable while the plurality of optical fiber cores remain horizontally fixed with respect to the sample.

19. The method of claim 14, wherein the support structure comprises a plurality of support structure groups, wherein each respective support structure group of the plurality of support structure groups is associated with a respective group of optical fiber cores, and wherein the method further comprises:
adjusting a vertical position of a particular support structure group independently of at least one other support structure group based on height variations of a surface of sample.

20. A non-transitory computer-readable storage medium having stored thereon instructions that, when executed by a computing device, cause the computing device to perform operations comprising:
causing a light emitter to emit light into a plurality of optical fiber cores, wherein the light emitter is optically connected to the plurality of optical fiber cores at a second side of a support structure, wherein the support structure comprises an optical fiber cladding and defines therein a plurality of substantially parallel cavities extending from a first side of the support structure to the second side of the support structure, wherein each respective optical fiber core of the plurality of optical fiber cores extends from the second side of the support structure through a corresponding cavity of the plurality of substantially parallel cavities and includes an axial protrusion that protrudes axially from the optical fiber cladding at the first side of the support structure, wherein the axial protrusion of each respective optical fiber core tapers from a first diameter at the first side of the support structure down to a second diameter at an end of the axial protrusion, and wherein a cut-off size associated with the light is greater than or equal to the second diameter such that, upon reaching a cut-off portion of the axial protrusion having the cut-off size, the light is reflected at the cut-off portion and generates an evanescent electromagnetic wave at the cut-off portion;
receiving, from each respective light detector of a plurality of light detectors, a signal indicating an intensity of the light reflected from the cut-off portion of a corresponding optical fiber core, wherein each respective light detector of the plurality of light detectors is optically connected at the second side of the support structure to the corresponding optical fiber core; and
determining, for each respective optical fiber core and based on the signal, a distance between the cut-off portion of the respective optical fiber core and a sample disposed adjacent to the end of the axial protrusion of the respective optical fiber core.

\* \* \* \* \*